United States Patent

Genz et al.

[11] Patent Number: 5,908,894
[45] Date of Patent: Jun. 1, 1999

[54] THERMOPLASTIC POLYURETHANES AND THEIR PREPARATION

[75] Inventors: Manfred Genz, Damme; Frank Prissok, Lemförde; Peter Horn, Heidelberg; Ruediger Krech, Diepholz; Gerhard Lehr, Schwegenheim; Horst King, Limburgerhof, all of Germany

[73] Assignee: Basf Aktiengesellschaft, Germany

[21] Appl. No.: 08/969,841

[22] Filed: Nov. 13, 1997

[51] Int. Cl.⁶ .............................. C08J 3/00; C08J 11/04; C08K 3/20; C08L 75/00
[52] U.S. Cl. .......................... 524/590; 521/49; 521/49.5; 524/589; 528/44; 528/59; 528/60; 528/65; 528/85
[58] Field of Search ...................... 524/589, 590; 528/44, 59, 60, 65, 85; 521/49, 49.5

[56] References Cited

U.S. PATENT DOCUMENTS 3,549,472  12/1970  King et al. .................. 161/87
3,935,132   1/1976  Gerkin et al. ............... 260/2.3

FOREIGN PATENT DOCUMENTS 1753702  7/1971  Germany .

OTHER PUBLICATIONS

EPO Search Report & Translation Dated Feb. 24, 1998.

*Primary Examiner*—Patrick D. Niland
*Attorney, Agent, or Firm*—James J. Drake

[57] ABSTRACT

Thermoplastic polyurethanes are prepared by reacting (a) isocyanates with (b) compounds reactive toward isocyanates, in the presence or absence of (c) chain extenders, (d) catalysts and (e) customary auxiliaries and additives and adding crosslinked polyurethanes in comminuted form before, during and/or after the reaction.

15 Claims, No Drawings

THERMOPLASTIC POLYURETHANES AND THEIR PREPARATION

The present invention relates to a process for preparing thermoplastic polyurethanes with reuse of crosslinked polyurethanes in comminuted form.

Thermoplastic polyurethanes, hereinafter abbreviated to TPUs, have been known for a long time. Their industrial importance is based on the combination of good mechanical properties with the advantages of low-cost thermoplastic processing which can be carried out continuously or batchwise by various known methods, for example the belt process or the extruder process. An overview of TPUs, their properties and applications is given in, for example, "Kunststoff-Handbuch", Volume 7, Polyurethane, 3rd edition, 1993, edited by G. Oertel, Carl Hanser Verlag, Munich.

Thermoplastic processing would be a simple and useful method for reusing polyurethane waste. This is not possible in the case of, for example, cellular or microcellular polyurethane elastomers, since these, owing to their three-dimensional crosslinked structure and the urea components frequently present, can as such not be thermoplastically processed.

Suitable methods of recycling polyurethanes are chemical processes such as hydrolysis, hydrogenation, pyrolysis and glycolysis. Furthermore, the polyurethanes can be dissolved in isocyanates and the mixture obtained after purification can be reused (DE-A-43 16 389). All these processes have in common the fact that the polyurethanes can be reintroduced into a production process only with a considerable outlay in terms of raw materials and energy.

Further methods of recycling which are described, for example, in "Polyurethanes Recycling—Status Report", K. W. Kroesen and D. A. Hicks, 1993, Cellular Polymers, paper 16, 1–6 are the preparation of compact polyurethanes from comminuted elastomers ("Flake Bonding") or the use as filler in the preparation of thermosets.

It is an object of the present invention to develop a process for preparing thermoplastic polyurethanes by reacting (a) isocyanates, (b) compounds reactive toward isocyanates and, if desired, (c) chain extenders, (d) catalysts and, if desired, (e) auxiliaries and additives by means of which polyurethanes which have a crosslinked structure and are thus as such not thermoplastically processible, for example and preferably cellular polyurethanes, particularly preferably microcellular polyurethane elastomers, can be thermoplastically processed without complicated chemical processes.

We have found that this objective is achieved by adding crosslinked polyurethanes in comminuted form to the reaction mixture before, during and/or after the reaction.

The crosslinked polyurethanes intended for reuse are comminuted using customary methods, for example shredded, e.g. in a rotary mill, at room temperature to a particle size of usually less than 10 mm, or milled, e.g. by known cold milling methods, for example while cooling with liquid nitrogen, in a roll or hammer mill to a particle size of less than 1 mm.

The comminuted crosslinked polyurethanes, hereinafter also preferred to as comminuted polyurethanes, usually have a size of from 0.1 to 25 mm, preferably from 0.5 to 10 mm, in particular from 2 to 6 mm. For the addition of the comminuted polyurethanes to the reaction mixture before the reaction, the preferred particle size is from 0.1 to 2 mm.

The comminuted polyurethanes are mixed with at least one of the components or with the reaction mixture before, during or after the reaction of the components. For example, the comminuted polyurethanes can be added to the reaction mixture comprising (a) isocyanates, (b) compounds reactive toward isocyanates, for example having a molecular weight of from 500 to 8000 g/mol, and, if desired, (c) chain extenders, (d) catalysts and, if desired, (e) auxiliaries and additives and subsequently reacted in a generally customary reaction extruder to give thermoplastic polyurethane.

The comminuted polyurethanes are usually employed in a weight ratio of from 0.001:1 to 4:1, based on the weight of the reaction mixture, preferably in a weight ratio of from 0.01:1 to 1:1, particularly preferably from 0.1:1 to 0.4:1.

The mixtures of the components (a), (b) and, if desired, (c), (d) and (e) for preparing the TPUs usually have an equivalence ratio of isocyanate groups of the component (a) to the sum of the reactive hydrogen atoms of the components (b) and (c) of from 0.9:1 to 1.5:1, preferably from 1.05:1 to 1.2:1, since the incorporation of the comminuted polyurethanes into one of the components, into the mixture or into the TPUs prepared using these mixtures can result in additional consumption of isocyanate groups.

The comminuted polyurethanes which are added to the reaction mixture before, during and/or after the reaction can advantageously have been mixed with plasticizer and have absorbed the latter. For example, the comminuted polyurethanes can be mixed with the plasticizer or mixtures comprising the plasticizer, preferably in a weight ratio of the polyurethanes to the plasticizer of at least 1:0.2, particularly preferably from 1:0.2 to 1:5, in particular from 1:0.5 to 1:2, with the polyurethanes absorbing the plasticizer. The temperature during the mixing procedure is preferably from 40 to 70° C., but lower or higher temperatures are also suitable. Customary plasticizers which can be used are, for example, phthalates, for example di-2-ethylhexyl phthalate, dioctyl phthalate, octylbenzyl phthalate, butyl benzyl phthalate, dibutyl glycol phthalate, bis(methyl diglycol) phthalate or dibutyl phthalate, organophosphorus compounds such as tris(2-chloroethyl) phosphate, tris(chloropropyl) phosphate, dimethyl methylphosphonate, diphenyl cresyl phosphate or tricresyl phosphate, adipic, azelaic or sebacic esters, phenyl alkylsulfonates, acetyl-tributyl citrate, epoxidized fatty acid esters, generally known polyester-based, oligomeric and polymeric plasticizers, tri-2-ethylhexyl trimellitate, triisooctyl trimellitate, dibutyl adipate, dioctyl adipate and also further materials generally known as plasticizers. Preference is given to using butyl benzyl phthalate as plasticizer.

The absorption of the plasticizer into the polyurethanes can occur over a period of from 5 to 60 minutes after mixing the components, with these times depending on the temperatures and any aids employed (e.g. mixing, stirring and shaking). Procedures which accelerate this process, e.g. stirring and shaking, are preferably employed. These comminuted, plasticizer-containing polyurethanes are preferably added in a weight ratio of polyurethane to plasticizer of from 1:0.2 to 1:2 when the comminuted polyurethanes are processed, e.g. extruded, together with the reaction mixture, i.e. the TPU, after the reaction of the components (a), (b) and, if desired, (c), (d) and (e).

The processing of the comminuted polyurethanes containing the plasticizer with the TPUs, which are usually in the form of granules or powder, is carried out by customary methods. For example, the TPUs are mixed with the comminuted plasticizer-containing polyurethanes, for example at from 0 to 150° C., preferably from 10 to 100° C. and in particular from 10 to 35° C. The mixture can subsequently be homogenized at from 150 to 250° C., preferably from 160 to 230° C. and in particular from 180 to 220° C., for example in a flowable, softened or molten state, preferably with degassing, e.g. by stirring, rolling, kneading or extruding, for example using a roller apparatus, a kneader or an extruder and processed to give the desired TPUs. The comminuted cellular polyurethanes and the TPUs are preferably introduced into an extruder either individually or in admixture, e.g. at from 150 to 250° C., preferably from 160 to 230° C. and in particular from 180 to 220° C., partially molten, the mixture is extruded, e.g. on a single- or twin-screw machine, preferably with degassing, cooled and subsequently granulated. The granules can be subjected to intermediate storage or be directly further processed into the desired products.

Owing to the absorption of the plasticizer into the comminuted polyurethanes, the latter can be processed very well with the TPUs and the products have very good properties.

The comminuted polyurethanes used are preferably cellular polyurethanes, in particular microcellular polyurethane elastomers.

The comminuted polyurethanes and also the mixtures for preparing thermoplastic polyurethane elastomers are, as is known, based on (a) organic isocyanates, (b) compounds reactive toward isocyanates and having a molecular weight of from 500 to 8000 g/mol and also, if desired, (c) chain extenders, (d) catalysts and, if desired, (e) auxiliaries and additives. Furthermore, the comminuted polyurethanes can have been prepared using crosslinkers and blowing agents, e.g. water.

The components mentioned are described below:

a) Suitable organic isocyanates (a) are preferably aliphatic, cycloaliphatic and in particular aromatic diisocyanates. Specific examples are: aliphatic diisocyanates such as hexamethylene 1,6-diisocyanate, 2-methylpentamethylene 1,5-diisocyanate, 2-ethylbutylene 1,4-diisocyanate or mixtures of at least two of the $C_6$-alkylene diisocyanates mentioned, pentamethylene 1,5-diisocyanate and butylene 1,4-diisocyanate, cycloaliphatic diisocyanates, such as 1-isocyanato-3,3,5-trimethyl-5-isocyanatomethylcyclohexane (isophorone diisocyanate), cyclohexane 1,4-diisocyanate, 1-methylcyclohexane 2,4- and 2,6-diisocyanate and also the corresponding isomer mixtures, dicyclohexylmethane 4,4'-, 2,4'- and 2,2'-diisocyanate and also the corresponding isomer mixtures and preferably aromatic diisocyanates such as tolylene 2,4-diisocyanate, mixtures of tolylene 2,4- and 2,6-diisocyanate, diphenylmethane 4,4'-, 2,4'- and 2,2'-diisocyanate, mixtures of diphenylmethane 2,4'- and 4,4'-diisocyanate, urethane-modified liquid diphenylmethane 4,4'- and/or 2,4'-diisocyanates, 1,2-bis(4-isocyanatophenyl)ethane and naphthylene 1,5-diisocyanate. Preference is given to using hexamethylene 1,6-diisocyanate, dicyclohexylmethane 4,4'-diisocyanate, isophorone diisocyanate, diphenylmethane diisocyanate isomer mixtures having a diphenylmethane 4,4'-diisocyanate content of more than 96% by weight and in particular diphenylmethane 4,4'-diisocyanate.

b) Suitable substances (b) which are reactive toward isocyanates are, for example, polyhydroxyl compounds having molecular weights of from 500 to 8000, preferably polyetherols and polyesterols. However, other substances which are useful are hydroxyl-containing polymers, for example polyacetals such as polyoxymethylene and especially water-insoluble formals, e.g. polybutanediol formal and polyhexanediol formal, and aliphatic polycarbonates, in particular those prepared from diphenyl carbonate and 1,6-hexanediol, by transesterification, and having the abovementioned molecular weights. The polyhydroxyl compounds mentioned can be employed as individual components or in the form of mixtures.

The mixtures for preparing the TPU(s) have to be based at least predominantly on difunctional substances reactive toward isocyanates. The TPUs prepared using these mixtures are thus predominantly unbranched, ie. predominantly uncrosslinked.

Suitable polyetherols can be prepared by known methods, for example by anionic polymerization using alkali metal hydroxides such as sodium or potassium hydroxide or alkali metal alkoxides such as sodium methoxide, sodium or potassium ethoxide or potassium isopropoxide as catalysts or by cationic polymerization using Lewis acids such as antimony pentachloride, boron fluoride etherate, etc., or bleaching earth as catalysts from one or more alkylene oxides having from 2 to 4 carbon atoms in the alkylene radical and, if desired, an initiator molecule containing two reactive hydrogen atoms in bonded form. Examples of alkylene oxides which may be mentioned are: ethylene oxide, 1,2-propylene oxide, tetrahydrofuran, 1,2- and 2,3-butylene oxide. Preference is given to using ethylene oxide and mixtures of 1,2-propylene oxide and ethylene oxide. The alkylene oxides can be used individually, alternately in succession or as a mixture. Suitable initiator molecules are, for example: water, aminoalcohols such as N-alkyldialkanolamines, for example N-methyldiethanolamine, and diols, such as alkanediols or dialkylene glycols having from 2 to 12 carbon atoms, preferably from 2 to 6 carbon atoms, e.g. ethanediol, 1,3-propanediol, 1,4-butanediol and 1,6-hexanediol. If desired, mixtures of initiator molecules can also be used. Other suitable polyetherols are the hydroxyl-containing polymerization products of tetrahydrofuran (polyoxytetramethylene glycols).

Preference is given to using polyetherols derived from 1,2-propylene oxide and ethylene oxide in which more than 50%, preferably from 60 to 80%, of the OH groups are primary hydroxyl groups and at least part of the ethylene oxide is present as a terminal block, and in particular polyoxytetramethylene glycols.

Such polyetherols can be obtained by, for example, first polymerizing the 1,2-propylene oxide onto the initiator molecule and then polymerizing on the ethylene oxide or first copolymerizing all the 1,2-propylene oxide in admixture with part of the ethylene oxide and then polymerizing on the remainder of the ethylene oxide or, stepwise, first polymerizing part of the ethylene oxide onto the initiator molecule, then polymerizing on all the 1,2-propylene oxide and then polymerizing on the remainder of the ethylene oxide.

The polyetherols, which are essentially linear in the case of the TPUs, have molecular weights of from 500 to 8000, preferably from 600 to 6000 and in particular from 800 to 3500. They can be used either individually or in the form of mixtures with one another.

Suitable polyesterols can be prepared, for example, from dicarboxylic acids having from 2 to 12 carbon atoms, preferably from 4 to 8 carbon atoms, and polyhydric alcohols. Examples of suitable dicarboxylic acids are: aliphatic dicarboxylic acids such as succinic acid, glutaric acid, suberic acid, azelaic acid, sebacic acid and preferably adipic acid and aromatic dicarboxylic acids such as phthalic acid, isophthalic acid and terephthalic acid. The dicarboxylic acids can be used individually or as mixtures, e.g. in the form of a succinic, glutaric and adipic acid mixture. Likewise, mixtures of aromatic and aliphatic dicarboxylic acids can be used. To prepare the polyesterols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids. Examples of polyhydric alcohols are alkanediols having from 2 to 10, preferably from 2 to 6, carbon atoms, e.g. ethanediol, 1,3-propanediol, 1,4-butanediol 1,5-pentanediol 1,6-hexanediol, 1,10-decanediol, 2,2-dimethylpropane-1,3-diol and 1,2-propanediol and also dialkylene ether glycols such as diethylene glycol and dipropylene glycol. Depending on the desired properties, the polyhydric alcohols can be used alone or, if desired, in admixture with one another.

Also suitable are esters of carbonic acid with the diols mentioned, in particular those having from 4 to 6 carbon atoms, e.g. 1,4-butanediol and/or 1,6-hexanediol, condensation products of ω-hydroxycarboxylic acids, for example ω-hydroxycaproic acid, and preferably polymerization products of lactones, for example substituted or unsubstituted ω-caprolactones.

Polyesterols which are preferably used are alkanediol polyadipates having from 2 to 6 carbon atoms in the alkylene radical, e.g. ethanediol polyadipates, 1,4-butanediol polyadipates, ethanediol-1,4-butanediol polyadipates, 1,6-hexanediol-neopentyl glycol polyadipates, polycaprolactones and in particular 1,6-hexanediol-1,4-butanediol polyadipates.

The polyesterols have molecular weights (weight average) of from 500 to 6000, preferably from 800 to 3500.

c) As chain extenders (c), which usually have molecular weights of from 60 to 499, preferably from 60 to 300, preference is given to alkanediols having from 2 to 12 carbon atoms, preferably 2,4 or 6 carbon atoms, e.g. ethanediol, 1,6-hexanediol and in particular 1,4-butanediol, and dialkylene ether glycols such as diethylene glycol and dipropylene glycol. However, other suitable chain extenders are diesters of terephthalic acid with alkanediols having from 2 to 4 carbon atoms, e.g. bis(ethanediol) or bis(1,4-butanediol) terephthalate, hydroxyalkylene ethers of hydroquinone, e.g. 1,4-di(β-hydroxyethyl)hydroquinone, (cyclo)aliphatic diamines such as 4,4'-diaminodicyclohexylmethane, 3,3'-dimethyl-4,4'-diaminodicyclohexylmethane, 1-amino-3,3,5-trimethyl-5-aminomethylcyclohexane, ethylenediamine, 1,2-, or 1,3-propylenediamine, N-methylpropylene-1,3-diamine, N,N'-dimethylethylenediamine and aromatic diamines, such as 2,4- and 2,6-tolylenediamine, 3,5-diethyl-2,4- and -2,6-tolylenediamine and primary, ortho-dialkyl-, ortho-trialkyl- and/or ortho-tetraalkyl-substituted 4,4'-diaminodiphenylmethanes. Chain extenders which are preferably used are alkanediols having from 2 to 6 carbon atoms in the alkylene radical, in particular 1,4-butanediol, and/or dialkylene glycols having from 4 to 8 carbon atoms.

To adjust the hardness and melting point of the TPUs, the formative components (b) and (c) can be varied within a relatively wide range of molar ratios. Molar ratios of polyhydroxyl compounds (b) to chain extenders (c) of from 1:1 to 1:12, in particular from 1:1.8 to 1:6.4, have been found to be useful, with the hardness and the melting point of the TPUs increasing with increasing diol content.

d) Suitable catalysts which, in particular, accelerate the reaction between the NCO groups of the diisocyanates (a) and the hydroxyl groups of the formative components (b) and (c) are the customary catalysts known from the prior art, viz. tertiary amines such as triethylamine, dimethylcyclohexylamine, N-methylmorpholine, N,N'-dimethylpiperazine, 2-(dimethylaminoethoxy)ethanol, diazabicyclo(2.2.2) octane and the like and also, in particular, organic metal compounds such as titanic esters, iron compounds such as iron(III) acetylacetonate, tin compounds such as tin diacetate, tin dioctoate, tin dilaurate or the dialkyltin salts of aliphatic carboxylic acids such as dibutyltin diacetate, dibutyltin dilaurate or the like. The catalysts are usually used in amounts of from 0.002 to 0.1 part per 100 parts of polyhydroxyl compound (b).

e) In addition to catalysts, customary auxiliaries and/or additives (e) can also be added to the formative components (a) to (c). Examples which may be mentioned are surface-active substances, foam stabilizers, cell regulators, fillers, flame retardants, nucleating agents, oxidation inhibitors, stabilizers, lubricants and mold release agents, dyes and pigments, inhibitors, stabilizers against hydrolysis, light, heat or discoloration, inorganic and/or organic fillers, reinforcers and plasticizers.

Further information about the abovementioned auxiliaries and additives may be found in the specialist literature, for example the monograph by J. H. Saunders and K. C. Frisch "High Polymers", Volume XVI, Polyurethanes, Parts 1 and 2, Interscience Publishers 1962 and 1964, and the abovementioned Kunststoff Handbuch, Volume XII, Polyurethane or DE-A 29 01 774.

The comminuted crosslinked polyurethanes can also have been prepared using known crosslinkers having a molecular weight of less than 499, i.e. compounds reactive toward isocyanates which are at least trifunctional in the context of the isocyanate reaction, blowing agents such as materials having a boiling point at atmospheric pressure in the range from −40° C. to 120° C., gases and also solid blowing agents and in particular water which also has a crosslinking action. Furthermore, the comminuted crosslinked polyurethanes can have been prepared using generally known isocyanate-reactive compounds having molecular weights of from 500 to 8000 which have a functionality of greater than 2, for example from 3 to 9, and thus lead, like the crosslinkers having a molecular weight of less than 499, to crosslinking of the polyurethanes. These crosslinked polyurethanes are as such not thermoplastically processible.

The cellular polyurethanes, in particular the microcellular polyurethane elastomers, are preferably based on naphthylene 1,5-diisocyanate (1,5-NDI), polyphenylpolymethylene polyisocyanates (polymeric MDI, PMDI) having two or more aromatic systems, mixtures of diphenylmethane 2,4'-, 2,2'- and 4,4'-diisocyanates and polyphenylpolymethylene polyisocyanates (raw MDI), mixtures of raw MDI and tolylene diisocyanates and/or polyphenyl polyisocyanates and also on, as substances reactive toward isocyanates, preferably polyhydroxyl compounds having a functionality of from 2 to 3, preferably 2, and have preferably been prepared using water as blowing agent and crosslinker.

As indicated above, the reaction mixture comprising (a), (b) and, if desired, (c), (d) and/or (e) can, before, during or after the reaction with the comminuted polyurethanes, preferably cellular polyurethane elastomers, in particular microcellular polyurethane elastomers, be reacted by the extruder process or preferably by the belt process. Specifically, the belt process is carried out as follows:

The formative components (a) to (c) and the comminuted polyurethane elastomers, which in this case preferably have a particle size of less than 3 mm, plus, if desired, (d) and/or (e) are continuously mixed by means of a mixing head at temperatures above the melting point of the formative components (a) to (c). The reaction mixture is applied to a support, preferably a conveyor belt, and conveyed through a heated zone. The reaction temperature in the heated zone can be from 60 to 200° C., preferably from 100 to 180° C., and the residence time is generally from 0.05 to 0.5 hours, preferably from 0.1 to 0.3 hours. After the reaction is complete, the TPU is allowed to cool and is subsequently comminuted or granulated.

In the extruder process, the formative components (a) to (c) and the comminuted polyurethane elastomers plus, if desired, (d) and (e) are introduced individually or as a mixture into the extruder, reacted at, for example, from 100 to 250° C., preferably from 140 to 220° C., and the resulting TPU is extruded, cooled and granulated.

If previously reacted TPUs are extruded with the comminuted polyurethanes, preference is given to using comminuted polyurethane elastomers containing plasticizer.

The advantages of the present invention will be illustrated by the following examples.

Example 1

5000 g of microcellular polyurethane elastomers (Cellasto®) were shredded and the comminuted elastomers were subsequently mixed at 50° C. with butyl benzyl phthalate as plasticizer in different weight ratios. Owing to the cellular structure, the elastomer absorbs the plasticizer very well, so that mixing the components at from 40 to 60° C. for from 5 to 15 minutes is sufficient for the swelling process. 1000 g of the comminuted elastomer which had absorbed the plasticizer were subsequently extruded together with a thermoplastic polyurethane elastomer based on polybutanediol-ethanediol adipate, having a mean molecular weight of 2000 g/mol, MDI, butanediol and a carbodiimide in different weight ratios using a 19 mm twin-screw extruder at a composition temperature of 220° C., 100 revolutions per minute and an output of 3 kg per hour. The thermoplastic products have the properties shown in Table 1.

TABLE 1

| Product | 1 | 2 | 3 | 4 | Comparison |
|---|---|---|---|---|---|
| TPU [% by weight] | 40 | 30 | 50 | 40 | 100 |
| Plasticizer [% by weight] | 30 | 40 | 20 | 10 | 0 |
| Microcellular polyurethane elastomer [% by weight] | 30 | 30 | 30 | 40 | 0 |
| Hardness | 54A | 47A | 60A | 73A | 83A |
| Tensile strength [Mpa] | 21 | 18 | 22 | 29 | 54 |
| Elongation at break [%] | 960 | 1060 | 840 | 760 | 670 |
| Tear propagation resistance [N/mm] | 31 | 26 | 38 | 54 | 67 |
| Abrasion [mm³] | 55 | 70 | 70 | 76 | 35 |

Hardness: Shore hardness, DIN 53505
Tensile strength: DIN 53504 - S2
Elongation at break: DIN 53504 - S2
Tear propagation resistance: DIN 53515
Abrasion: DIN 53516
Crompressive set: DIN 53517

The thermoplastic polyurethane elastomers prepared according to the present invention display significantly improved behavior in terms of the elongation at break when compared with the comparison TPU which was prepared without comminuted microcellular polyurethane elastomers which had been treated with plasticizer. The TPUs obtained using recycled cellular elastomers and having this property profile can be used, for example, in the following areas: flexible injection-molded products, e.g. for shoe manufacture, soles, buffers, for example damping elements, underlays, floor mats, grips and seals. In addition, the reuse of the crosslinked polyurethanes conserves raw material resources and reduces the need for waste disposal.

Example 2

Microcellular polyurethane elastomers (Cellasto®) were shredded, the products were subsequently milled and extruded together with a mixture for preparing a thermoplastic polyurethane, comprising 1000 parts of polybutanediol adipate having a mean molecular weight of 2500 g/mol, 880 parts of MDI, 279 parts of 1,4-butanediol and 10 parts of a carbodiimide as hydrolysis inhibitor, in a twin-screw extruder having a screw diameter of 34 mm and a screw length of 1190 mm at a composition temperature of 215° C. The thermoplastic products had the properties shown in Table 2.

TABLE 2

| Product | 1 | 2 | 3 | Comparison |
|---|---|---|---|---|
| TPU [% by weight] | 70 | 65 | 60 | 100 |
| Microcellular polyurethane elastomer [% by weight] | 30 | 35 | 40 | 0 |
| Hardness | 53D | 52D | 48D | 61D |
| Tensile strength [MPa] | 59 | 64 | 55 | 56 |
| Elongation at break [%] | 490 | 540 | 540 | 440 |
| Tear propagation resistance [N/mm] | 113 | 103 | 104 | 155 |
| Abrasion [mm³] | 25 | 26 | 26 | 28 |

Hardness: Shore hardness, DIN 53505
Tensile strength: DIN 53504 - S2
Elongation at break: DIN 53504 - S2
Tear propagation resistance: DIN 53515
Abrasion: DIN 53516
Crompressive set: DIN 53517

Mixing of the comminuted microcellular polyurethane elastomers with plasticizer was not necessary since the components for preparing the TPU are absorbed very well by the cellular elastomer. Despite the content of 30–40% of microcellular elastomers, the products display tensile strengths and abrasion values which correspond to those of a commercial TPU having a Shore hardness in a similar range. The behavior of the thermoplastic polyurethanes in respect of the elongation at break was able to be considerably improved by incorporation of the comminuted microcellular polyurethanes. Owing to these properties, the TPUs prepared according to the present invention are very well suited for use in, for example, the shoe industry.

We claim:

1. A process for preparing thermoplastic polyarethanes by reacting (a) one or more isocyanates with (b) one or more compounds reactive toward isocyanates to form thermoplastic polyurethanes, wherein crosslinked polyurethanes in comminuted form are added to the reaction mixture;

wherein the comminuted polyurethanes are mixed with a plasticizer in a weight ratio of from 1:0.2 to 1:2, whereby the comminuted polyurethanes absorb the plasticizer, and the comminuted polyurethanes containing the plasticizer are subsequently added to the reaction mixture;

wherein the plasticizer is selected from the group consisting of di-2-ethylhexyl phthalate, dioctyl phthalate, octylbenzyl phthalate, butyl benzyl phthalate, dibutyl glycol phthalate, bis(methyl diglycol) phthalate, and dibutyl phthalate, organophosphorus compounds selected from the group consisting of tris (2-chloroethyl) phosphate, tris (chloropropyl) phosphate, dimethyl methylphosphonate, diphenyl cresyl phosphonate and tricresyl phosphate, adipic esters, azelaic esters, sebacic esters, phenyl alkylsulfonates, acetyl-tributyl citrate, epoxidized fatty acid esters, tri-2-ethylhexyl trimellitate, triisoocyl trimellitate, dibutyl adipate and dioctyl adipate.

2. The process of claim 1, wherein the comminuted polyurethanes have a size of from about 0.1 to about 25 millimeters.

3. The process of claim 1, wherein the comminuted polyurethanes are added to the reaction mixture in a weight ratio of from 0.001:1 to 4:1, based on the weight of the reaction mixture.

4. The process of claim 3, wherein the comminuted polyurethanes are added to the reaction mixture in a weight ratio of from 0.01:1 to 1:1, based on the weight of the reaction mixture.

5. The process of claim 1, wherein the equivalence ratio of isocyanate groups in the isocyanates to the sum of reactive hydrogen atoms in the compounds reactive toward isocyanates is from 0.9:1 to 1.5:1.

6. The process of claim 1, wherein the comminuted, plasticizer-containing polyurethanes are added to the reaction mixture after the isocyanates and compounds reactive toward isocyanates have reacted and the resulting mixture containing the comminuted polyurethanes is processed to produce thermoplastic polyurethanes.

7. The process of claim 1, wherein the comminuted, plasticizer-containing polyurethanes contain plasticizer in a weight ratio of the polyurethanes to the plasticizer of from 1:0.2.

8. The process of claim 1, wherein the comminuted polyurethanes have a cellular structure.

9. The process of claim 1, wherein the comminuted polyurethanes are microcellular polyurethane elastomers.

10. The process of claim 1, further comprising the addition of chain extender compositions selected from the group consisting of ethanediol, 1,6-hexanediol, 1,4-butanediol, diethylene glycol, propylene glycol, bis(ethanediol), bis(1, 4-butanediol) terephthalate, 1,4-di($\beta$-hydroxyethyl) hydroquinone, 4,4'-diaminodicyclohexylmethane, 3,3'-dimethyl-4,4'-diaminodicyclohexylmethane, 1-amino-3,3,5-trimethyl-5-aminomethylcyclohexane, ethylenediamine, 1,2-propylenediamine, 1,3-propylenediamine, N-methylpropylene-1,3-diamine, N,N'-dimethylethylenediamine, 2,4-toluenediamine, 2,6-toluenediamine, 3,5-diethyl-2,4-toluenediamine and 3,5-diethyl-2,6-toluenediamine.

11. The process of claim 1, further comprising the addition of a catalyst selected from the group consisting of triethylamine, dimethylcyclohexylamine N-methylmorpholine, N,N'-dimethylpiperazine, 2-(dimethylaminoethoxy)ethanol, diazabicyclo(2.2.2) octane, titanic esters, iron (III) acetylacetonate, tin diacetate, tin dioctoate, tin dilaurate, dibutyltin diacetate and dibutyltin dilaurante.

12. The process of claim 1, further comprising the addition of one or more additives selected from the group consisting of surface-active substances, foam stabilizers, cell regulators, fillers, flame retardants, nucleating agents, oxidation inhibitors, stabilizers, lubricants and mold release agents, dyes and pigments, inhibitors, stabilizers against hydrolysis, light, heat or discoloration, inorganic and/or organic fillers, reinforcers and plasticizers.

13. The process of claim 1, wherein the plasticizers is butylbenzyl phthalate.

14. The process of claim 1, wherein the isocyanates are selected from the group consisting of hexamethylene 1,6-diisocyanate, 2-methylpentamethylene 1,5-diisocyanate, 2-ethylbutylene 1,4-diisocyanate or mixtures thereof, pentamethylene 1,5-diisocyanates, butylene 1,4-diisocyanate, 1-isocyanato-3,3,5-trimethyl-5-isocyanatomethylcyclohexane, cyclohexane 1,4-diisocyanate, 1-methylcyclohexane 2,4-diisocyanate, 2,6-diisocyanate, dicyclohexylmethane, 4,4'-, 2,4'- and 2,2'-diisocyanate and corresponding isomer mixtures, tolylene 2,4-diisocyanates, mixtures of tolylene 2,4- and 2,6-diisocyanate, diphenylmethane 4,4'-, 2,4'- and 2,2'-diisocyanate, mixtures of diphenylmethane 2,4'- and 4,4'-diisocyanate, urethane-modified liquid diphenylmethane 4,4'- and/or 2,4'-diisocyanates, 1,2-bis(4-isocyanatophenyl) ethane and naphthylene 1,5-diisocyanate, hexamethylene 1,6-diisocyanate, dicyclohexylmethane 4,4'-diisocyanate and diphenylmethane diisocyanate isomer mixtures having a diphenylmethane 4,4'-diisocyanate content of more than 96 percent by weight.

15. The process of claim 1, wherein the compound reactive toward isocyanates is a polyoxytetramethyleneglycol.

* * * * *